US012761706B2

(12) United States Patent
Lee

(10) Patent No.: US 12,761,706 B2
(45) Date of Patent: Oct. 13, 2026

(54) ELECTRONIC DEVICE

(71) Applicant: Getac Technology Corporation, New Taipei City (TW)

(72) Inventor: Kun-Cheng Lee, Taipei City (TW)

(73) Assignee: Getac Technology Corporation, New Taipei City (TW)

( * ) Notice: Subject to any disclaimer, the term of this patent is extended or adjusted under 35 U.S.C. 154(b) by 184 days.

(21) Appl. No.: 18/786,861

(22) Filed: Jul. 29, 2024

(65) Prior Publication Data

US 2025/0208668 A1 Jun. 26, 2025

(30) Foreign Application Priority Data

Dec. 26, 2023 (CN) ......................... 202311811658.6

(51) Int. Cl.
*G06F 1/16* (2006.01)

(52) U.S. Cl.
CPC .......... *G06F 1/1683* (2013.01); *G06F 1/1681* (2013.01)

(58) Field of Classification Search
None
See application file for complete search history.

(56) References Cited

U.S. PATENT DOCUMENTS

| | | | | |
|---|---|---|---|---|
| 5,012,852 A * | 5/1991 | Blackhurst | B25H 1/20 | D24/232 |
| 7,564,679 B2 * | 7/2009 | Chen | F16M 11/28 | 361/679.21 |
| 7,646,593 B2 * | 1/2010 | Smejkalova | G06F 1/1681 | 361/679.21 |
| 7,724,511 B2 * | 5/2010 | Jacobs | G06F 1/1681 | 361/679.05 |
| 8,390,997 B1 * | 3/2013 | Dominy | G06F 1/1637 | 361/679.28 |
| 8,922,984 B2 * | 12/2014 | Chen | G06F 1/1624 | 345/169 |
| 9,292,043 B2 * | 3/2016 | Drew | F16M 11/2021 | |
| 10,782,744 B2 * | 9/2020 | Pasupathi | G06F 1/1683 | |
| 11,144,097 B1 * | 10/2021 | Hu | G06F 1/1601 | |
| 2006/0160585 A1 | 7/2006 | Miyagawa et al. | | |
| 2007/0008686 A1 * | 1/2007 | Jang | F16M 11/105 | 248/371 |
| 2014/0043749 A1 * | 2/2014 | Lai | G06F 1/1681 | 361/679.27 |
| 2018/0358795 A1 | 12/2018 | Li | | |
| 2020/0233451 A1 * | 7/2020 | Hong | G06F 1/1681 | |
| 2023/0029875 A1 | 2/2023 | Tan et al. | | |

FOREIGN PATENT DOCUMENTS

| | | |
|---|---|---|
| CN | 103259224 A | 8/2013 |
| TW | 586057 B | 5/2004 |
| TW | 201132275 A | 9/2011 |
| TW | 201423322 A | 6/2014 |
| TW | M642443 U | 6/2023 |

* cited by examiner

*Primary Examiner* — Xanthia C Relford
(74) *Attorney, Agent, or Firm* — Cooper Legal Group, LLC

(57) ABSTRACT

An electronic device that can be used with a plurality of cables includes a first component and a second component. The first component includes a first housing and a second housing connected to each other. An accommodation space is formed between the first housing and the second housing. An opening is formed at a junction of an edge of the first housing and the second housing. The second component is connected to the first component. The opening is configured for the cables to pass through so that the cables enter the accommodation space.

20 Claims, 5 Drawing Sheets

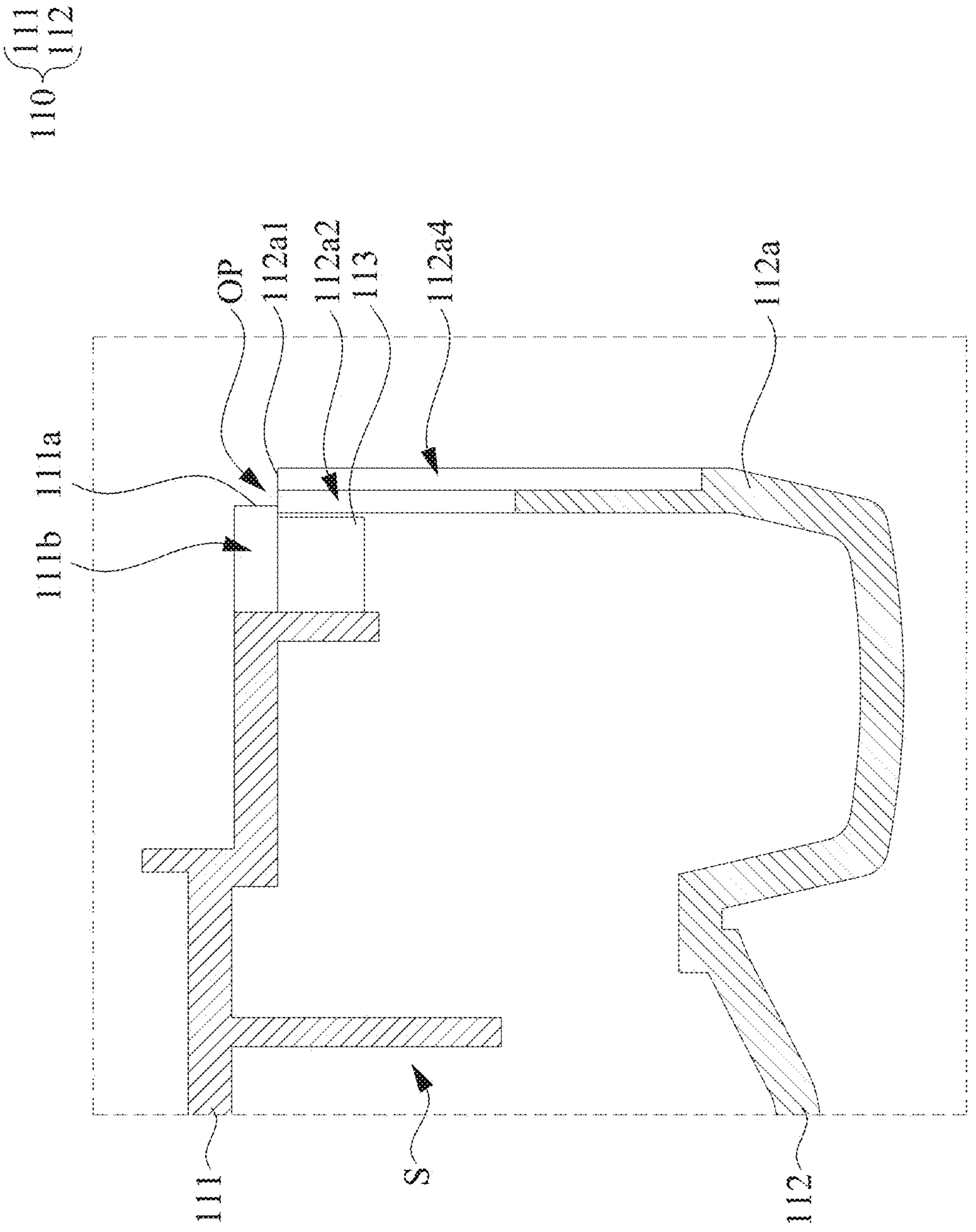
Fig. 5
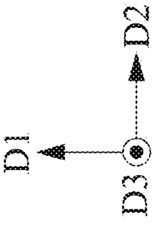

ELECTRONIC DEVICE

CROSS-REFERENCE TO RELATED APPLICATION

This application claims priority to China Application Serial Number 202311811658.6, filed Dec. 26, 2023, which is herein incorporated by reference.

BACKGROUND

Technical Field

The present disclosure relates to an electronic device, and more particularly, to an electronic device that can be used with cables.

Description of Related Art

Currently existing notebook computers generally include a host body and a display that can be flipped each other. For cables connected between the host body and the display, a through hole is usually designed on the upper housing of the host body to allow the cables to pass through and enter the interior of the host body. However, the way of passing the cables through the through hole of the upper housing requires a large configuration space, and the planning and utilization of the internal space of the host body is not ideal. In addition, due to internal space limitations, the through hole cannot be large enough to allow all types of cables to pass through at any angle. Therefore, when threading larger-sized cables, a user must first fold the connector at a distal end of the cables relative to the body of the cables and then squeeze it through the through hole. There is a risk of cable damage in this way. Furthermore, the cables at the threading point will be stacked/interlaced and messy, which can easily lead to assembly defects such as assembly crimping, misaligning, upper housing bulging, and etc.

Accordingly, how to provide an electronic device to solve the foregoing problems becomes an important issue to be solved by those in the industry.

SUMMARY

An aspect of the disclosure is to provide an electronic device to solve the foregoing problems.

According to an embodiment of the disclosure, an electronic device can be used with a plurality of cables. The electronic device includes a first component and a second component. The first component includes a first housing and a second housing connected to each other. An accommodation space is formed between the first housing and the second housing. An opening is formed at a junction of an edge of the first housing and the second housing. The second component is connected to the first component. The opening is configured for the cables to pass through so that the cables enter the accommodation space.

In one or more embodiments of the present disclosure, the electronic device further includes a plurality of a plurality of cable management structures. The cable management structures are disposed in the opening and configured to be respectively connected to the cables.

In one or more embodiments of the present disclosure, the cable management structures are disposed on the edge of the first housing.

In one or more embodiments of the present disclosure, the cable management structures are sequentially arranged along the edge of the first housing.

In one or more embodiments of the present disclosure, the edge of the first housing has a recess. The recess defines a part of an outline of the opening. The cable management structures are located in the recess.

In one or more embodiments of the present disclosure, the second housing includes a sidewall. The opening is formed at a junction of the edge of the first housing and the sidewall.

In one or more embodiments of the present disclosure, a top surface of the sidewall has a recess. The recess defines a part of an outline of the opening.

In one or more embodiments of the present disclosure, the electronic device further includes a cover. The cover covers the opening. An outer wall surface of the sidewall has a recess. The cover has a fixing portion. The fixing portion is fixed to the sidewall in the recess.

In one or more embodiments of the present disclosure, a surface of the fixing portion is substantially flush with the outer wall surface.

In one or more embodiments of the present disclosure, the electronic device further includes a hinge device and a cover. The first component and the second component are connected to each other through the hinge device. The cover covers the hinge device and the opening.

According to an embodiment of the disclosure, an electronic device includes a host body, a display, and a plurality of cables. The host body includes a first housing and a second housing connected to each other. An accommodation space is formed between the first housing and the second housing. An opening is formed at a junction of an edge of the first housing and the second housing. The display is connected to the host body. The opening is configured for the cables to pass through so that the cables enter the accommodation space.

In one or more embodiments of the present disclosure, the electronic device further includes a plurality of a plurality of cable management structures. The cable management structures are disposed in the opening and configured to be respectively connected to the cables.

In one or more embodiments of the present disclosure, the cable management structures are disposed on the edge of the first housing.

In one or more embodiments of the present disclosure, the cable management structures are sequentially arranged along the edge of the first housing.

In one or more embodiments of the present disclosure, the edge of the first housing has a recess. The recess defines a part of an outline of the opening. The cable management structures are located in the recess.

In one or more embodiments of the present disclosure, the second housing includes a sidewall. The opening is formed at a junction of the edge of the first housing and the sidewall.

In one or more embodiments of the present disclosure, a top surface of the sidewall has a recess. The recess defines a part of an outline of the opening.

In one or more embodiments of the present disclosure, the electronic device further includes a cover. The cover covers the opening. An outer wall surface of the sidewall has a recess. The cover has a fixing portion. The fixing portion is fixed to the sidewall in the recess.

In one or more embodiments of the present disclosure, a surface of the fixing portion is substantially flush with the outer wall surface.

In one or more embodiments of the present disclosure, the electronic device further includes a hinge device and a cover.

The host body and the display are connected to each other through the hinge device. The cover covers the hinge device and the opening.

Accordingly, in the electronic device of the present disclosure, the opening for the cables to pass through is provided at the junction of the edge of the first housing and the second housing. That is, the opening is formed on the edge of the first housing and can be formed when the first housing and the second housing are assembled. In this way, the planning and utilization in the accommodation space and of the first housing can be effectively improved. In addition, during assembly, in order to allow the cables to enter the accommodation space between the first housing and the second housing, the cables can be first abutted against the opening formed on the edge of the first housing, and then the first housing and the second housing are assembled. In this way, cables of various sizes can enter into the accommodation space without being folded, thereby effectively reducing the risk of cable damage. In addition, the cable management structures provided in the opening can neatly and fixedly arrange the cables to avoid the clutter of stacking/interlacing of the cables, thereby preventing assembly defects such as assembly crimping, misaligning, upper housing bulging, and etc.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 5 is a partial cross-sectional view of the first component in FIG. 3 taken along a cutting line 5-5.

DETAILED DESCRIPTION

Figure 1:
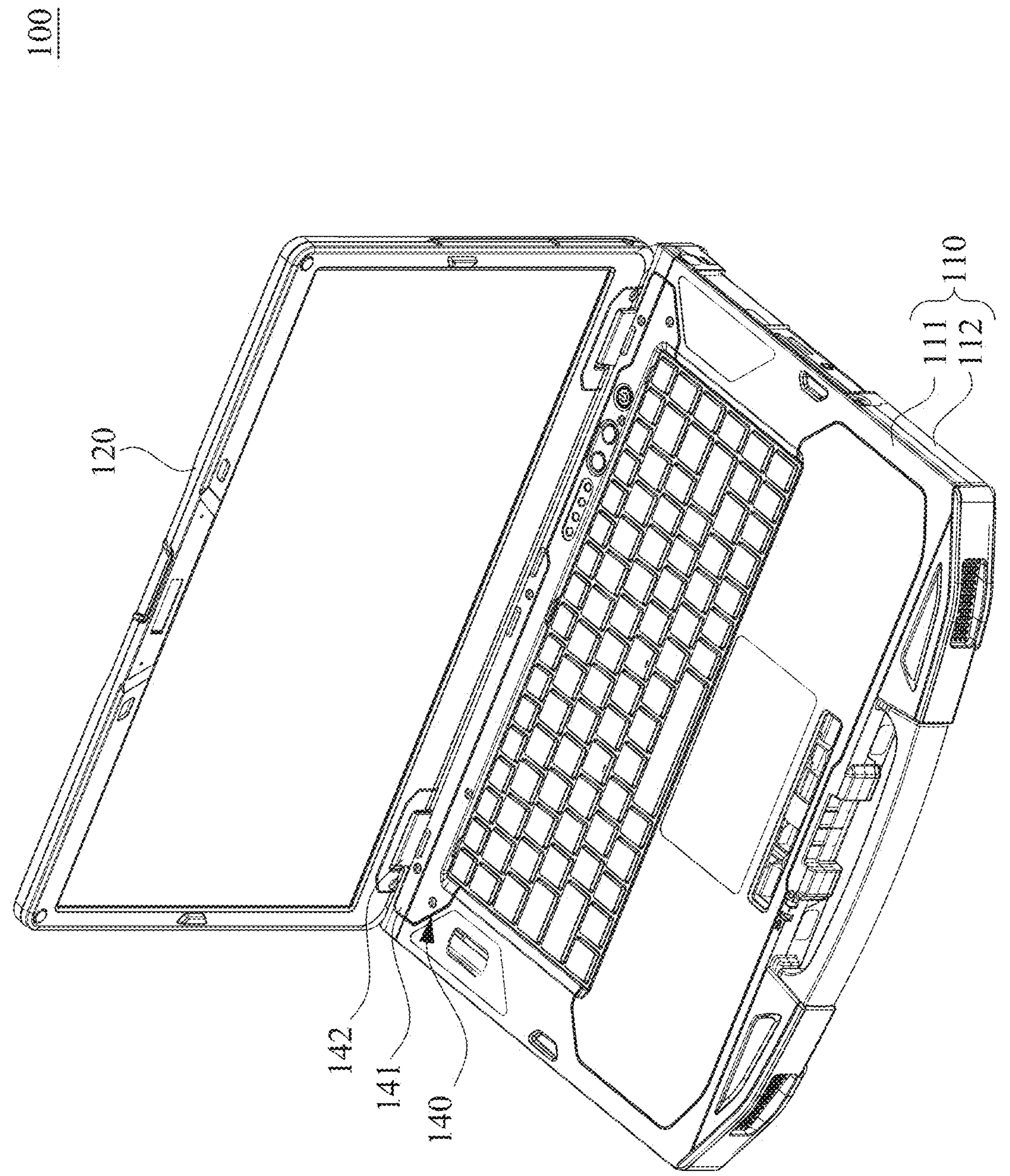
FIG. 1 is a perspective view of an electronic device according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a perspective view of an electronic device 100 according to an embodiment of the present disclosure. As shown in FIG. 1, the electronic device 100 includes a first component 110, a second component 120, a hinge device 130 (see FIG. 3), and a cover 140. The electronic device 100 takes a notebook computer as an example, in which the first component 110 can be a host body (with a keyboard device mounted thereon), and the second component 120 can be a display, but the present disclosure is not limited thereto. In practical applications, the electronic device 100 may be other types of electronic products.

Figure 2:
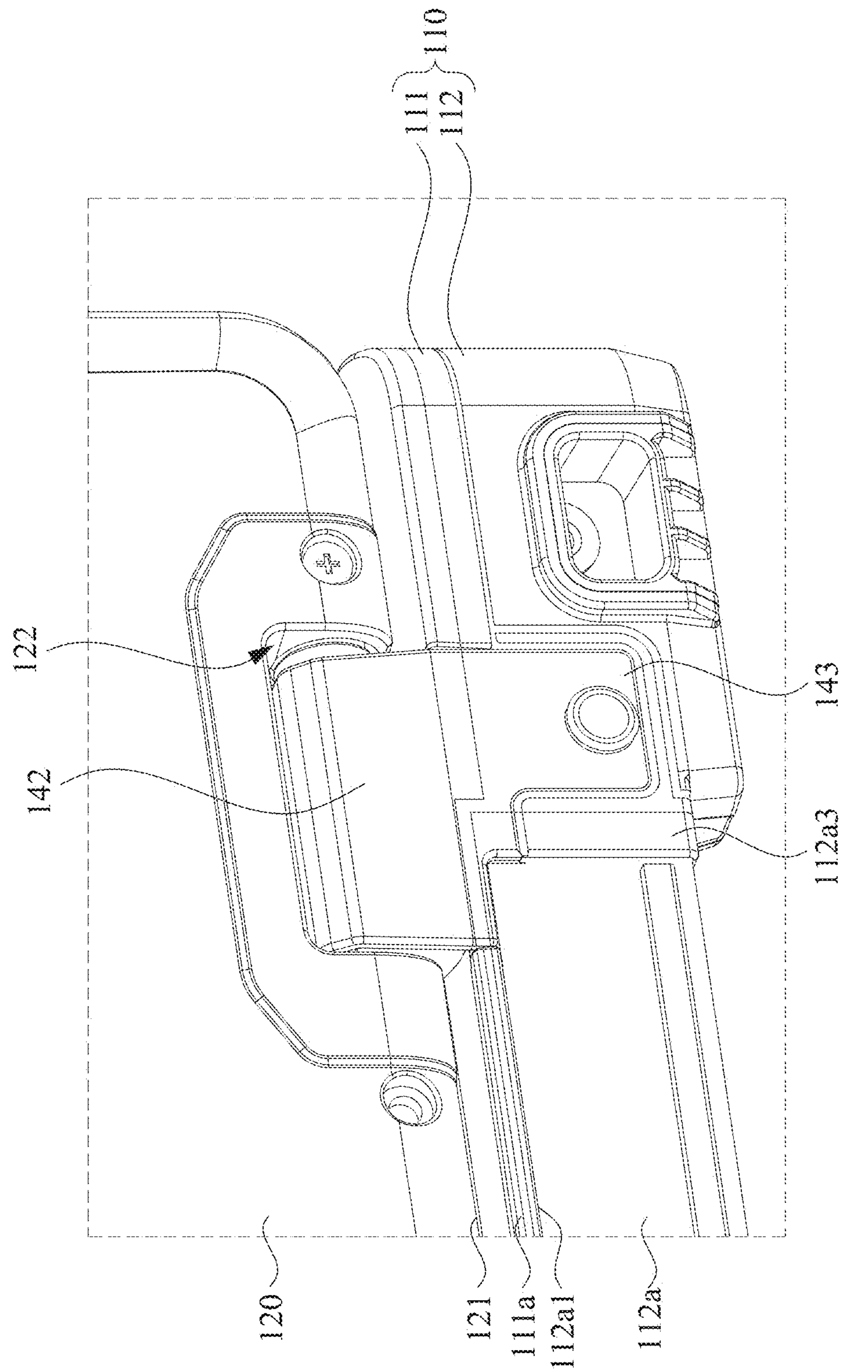
FIG. 2 is a partial perspective view of the electronic device in FIG. 1.
Figure 3:
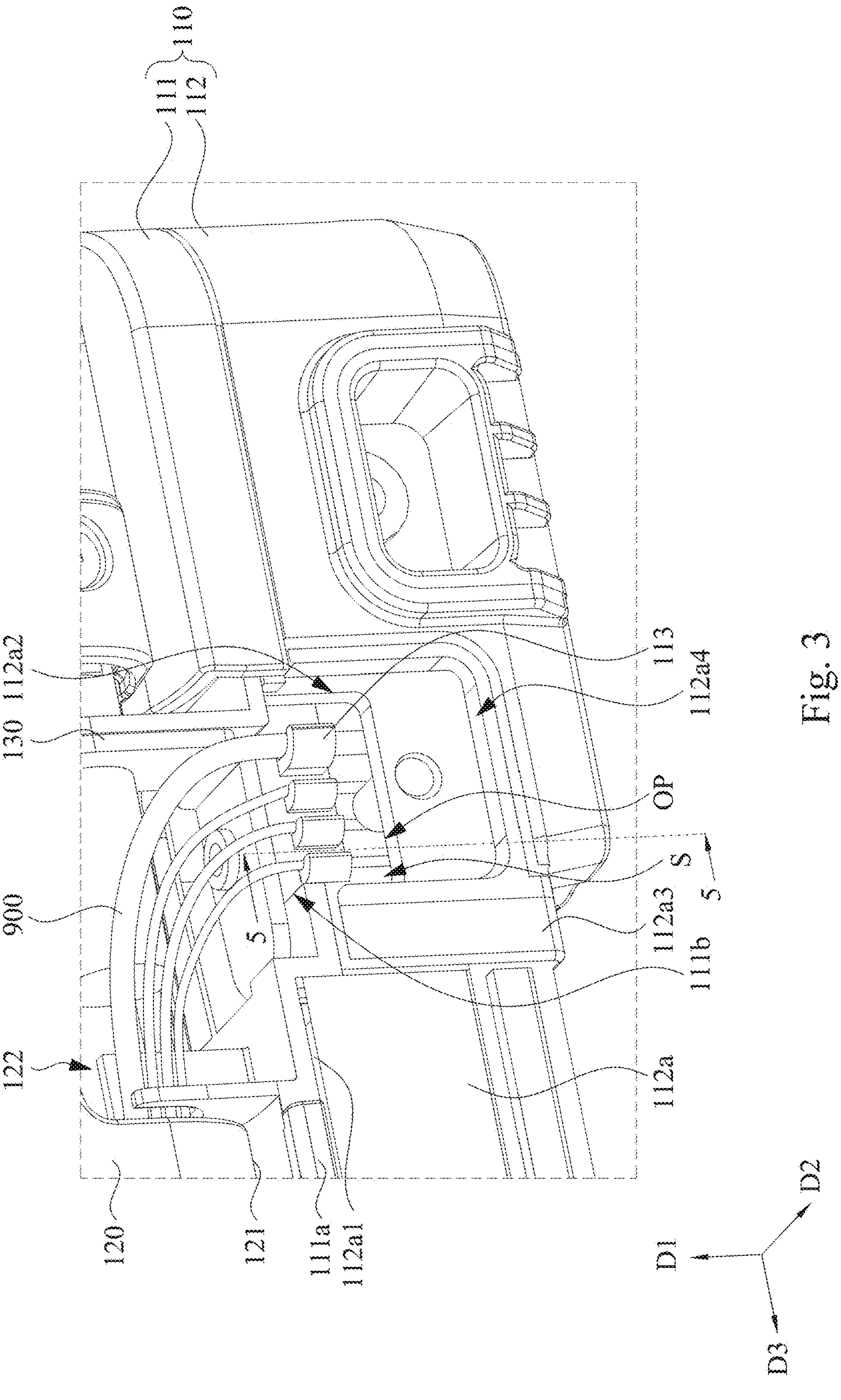
FIG. 3 is another partial perspective view of the electronic device in FIG. 1, in which a cover is removed.
Figure 4:
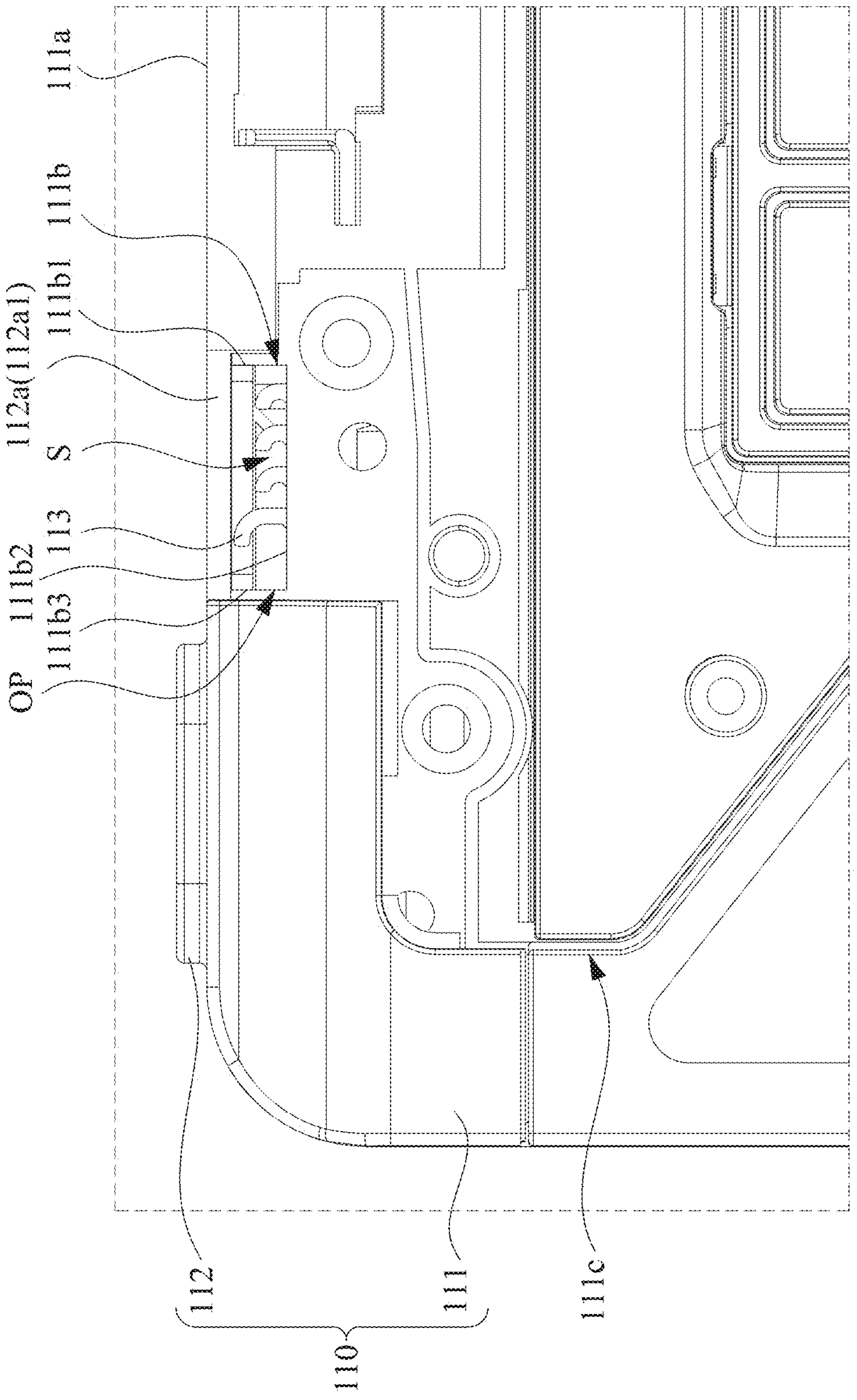
FIG. 4 is a top view of a first component in FIG. 1.

Reference is made to FIG. 2, FIG. 3, and FIG. 4. FIG. 2 is a partial perspective view of the electronic device 100 in FIG. 1. FIG. 3 is another partial perspective view of the electronic device 100 in FIG. 1, in which the cover 140 is removed. FIG. 4 is a top view of the first component 110 in FIG. 1. As shown in FIG. 2 to FIG. 4, the hinge device 130 is connected to the first component 110 and the second component 120, so that the first component 110 and the second component 120 can be flipped relative to each other. In detail, the first component 110 has an open slot 111*c*. The open slot 111*c* is opened on a surface of the first component 110 for the second component 120 to cover. The hinge device 130 is fixed to the first component 110 via the open slot 111*c* (for example, by screw fastening). The cover 140 covers the open slot 111*c* and covers the hinge device 130, thereby protecting the hinge device 130.

As shown in FIG. 1 and FIG. 2, the cover 140 includes a base portion 141 and a sleeve portion 142. The base portion 141 covers the open slot 111*c* and is fixed to the first housing 111. The first housing 111 with the open slot 111*c* can form a relatively complete integrated appearance with the base portion 141 covering the open slot 111*c*. The sleeve portion 142 is connected to the base portion 141 and is sleeved onto a portion (for example, a rotating shaft) of the hinge device 130 exposed outside the first component 110.

As shown in FIG. 1 to FIG. 3, the first component 110 of the electronic device 100 includes a first housing 111 and a second housing 112 connected to each other. The first housing 111 is an upper housing of the first component 110 and is provided with the keyboard device. The second housing 112 is a lower housing of the first component 110. An accommodation space is formed between the first housing 111 and the second housing 112. In addition, an opening OP through which the cables 900 can pass is formed at a junction of an edge 111*a* of the first housing 111 and the second housing 112. In other words, a part of the opening OP is formed on the edge 111*a* of the first housing 111, and can be formed when the first housing 111 and the second housing 112 are assembled. Through the structural configuration that the opening OP does not occupy a middle area of the first housing 111, the planning and utilization in the accommodation space S and of the first housing 111 can be effectively improved.

For example, two ends of the cables 900 can be respectively connected to the electronic components (such as a circuit board) inside the first component 110 and the electronic components (such as a display panel) inside the second component 120 for signal and/or power transmission. Generally speaking, the end of the cables 900 that enters the accommodation space S of the first component 110 is provided with a wire end connector, and the wire end connector is configured to be plugged into a socket-end connector on the circuit board.

Based on the aforementioned structural configurations, during assembly, as shown in FIG. 3, in order to allow the cables 900 to enter the accommodation space S between the first housing 111 and the second housing 112, the cables 900 can be first abutted against a portion of the edge 111*a* of the first housing 111 forming a part of the opening OP, and then the first housing 111 and the second housing 112 are assembled. In this way, the cables 900 of various sizes can enter the accommodation space S without being folded, thereby effectively reducing the risk of damage to the cables 900.

As shown in FIG. 2 and FIG. 3, the second component 120 has a recess 122. The recess 122 is inwardly formed from an edge 121 of the second component 120 (e.g., the edge 121 of the second component 120 adjacent to the first component 110). The cables 900 and the rotating shaft of the hinge device 130 can respectively enter the interior of the second component 120 through two opposite inner wall surfaces of the recess 122.

Reference is made to FIG. 5. FIG. 5 is a partial cross-sectional view of the first component 110 in FIG. 3 taken along a cutting line 5-5. As shown in FIG. 3 and FIG. 5, the edge 111*a* of the first housing 111 has a recess 111*b*. The recess 111*b* defines a part of an outline of the opening OP. For example, the first housing 111 and the second housing 112 are stacked and assembled in a direction D1, the recess 111*b* is inwardly formed from the edge 111*a* in a direction D2 perpendicular to the direction D1, the edge 111*a* extends along a direction D3 perpendicular to the direction D1 and the direction D2, but the present disclosure is not limited thereto.

As shown in FIG. 3 and FIG. 5, the second housing 112 includes a sidewall 112*a*. The opening OP is formed at a junction of the edge 111*a* of the first housing 111 and the sidewall 112*a*. Specifically, the sidewall 112*a* has a top surface 112*a*1. The top surface 112*a*1 is partially covered by the first housing 111. The top surface 112*a*1 has a recess 112*a*2 not covered by the first housing 111. The recess 112*a*2 defines a part of an outline of the opening OP. In other words, the outline of the opening OP is jointly defined by the recess 111*b* on the edge 111*a* of the first housing 111 and the recess 112*a*2 on the sidewall 112*a* of the second housing 112. For example, the recess 112*a*2 is inwardly formed from the top surface 112*a*1 of the sidewall 112*a* in the direction D1, but the present disclosure is not limited thereto.

It can be seen from this that the opening OP extending along the direction D1 and the direction D2 also means that the opening OP is provided at a corner of the first component 110, so the planning and utilization in the accommodation space S can be effectively improved.

As shown in FIG. 3 and FIG. 5, the electronic device 100 further includes a plurality of a plurality of cable management structures 113. The cable management structures 113 are disposed in the opening OP and configured to be respectively connected to the cables 900. The cable management structures 113 are disposed on the edge 111*a* of the first housing 111. In other words, the cable management structures 113 are disposed in the recess 111*b* on the edge 111*a*.

In detail, as shown in FIG. 4, the recess 111*b* is U-shaped and has three inner end surfaces 111*b*1, 111*b*2, and 111*b*3. The inner end surface 111*b*2 is connected between the inner end surfaces 111*b*1 and 111*b*3. In the embodiment shown in FIG. 4, the cable management structures 113 are disposed on the inner end surface 111*b*2 and are sequentially arranged along the edge 111*a* of the first housing 111 (i.e., along the direction D3 in FIG. 3), but the present disclosure is not limited thereto. In practical applications, the cable management structures 113 may be flexibly disposed on at least one of the inner end surfaces 111*b*1, 111*b*2, and 111*b*3.

As shown in FIG. 4, each of the cable management structures 113 is hook-shaped, and the cable management structures 113 are bent in the same direction (such as bending to the left in FIG. 4). Specifically, there is a gap between adjacent two of the cable management structures 113. The gap has a narrowed appearance, that is, an end of the gap away from the inner end surface 111*b*2 has a narrower entrance. Therefore, when a cable 900 enters the gap through a narrow entrance, the narrow entrance may increase the difficulty for the cable 900 to escape from the gap.

In some embodiments, in addition to being fixed to the first housing 111, the cover 140 may also be further fixed to the second housing 112. In this way, the cover 140 can further increase the assembly stability between the first housing 111 and the second housing 112. Specifically, as shown in FIG. 2 and FIG. 3, the cover 140 has a fixing portion 143. The fixing portion 143 is connected to a side of the sleeve portion 142 away from the base portion 141. The fixing portion 143 is fixed to an outer wall surface 112*a*3 of the sidewall 112*a*.

Furthermore, the outer wall surface 112*a*3 of the sidewall 112*a* has a recess 112*a*4. The recess 112*a*4 is inwardly formed from the outer wall surface 112*a*3 of the sidewall 112*a* (i.e., inwardly formed along the direction D2). The fixing portion 143 is fixed to the sidewall 112*a* in the recess 112*a*4. In this way, as shown in FIG. 2, a surface of the fixing portion 143 can be made substantially flush with the outer wall surface 112*a*3, so that the cover 140 having the fixing portion 143 and the sidewall 112*a* of the second housing 112 can form a relatively complete integrated appearance effect.

According to the foregoing recitations of the embodiments of the disclosure, it can be seen that in the electronic device of the present disclosure, the opening for the cables to pass through is provided at the junction of the edge of the first housing and the second housing. That is, the opening is formed on the edge of the first housing and can be formed when the first housing and the second housing are assembled. In this way, the planning and utilization in the accommodation space and of the first housing can be effectively improved. In addition, during assembly, in order to allow the cables to enter the accommodation space between the first housing and the second housing, the cables can be first abutted against the opening formed on the edge of the first housing, and then the first housing and the second housing are assembled. In this way, cables of various sizes can enter into the accommodation space without being folded, thereby effectively reducing the risk of cable damage. In addition, the cable management structures provided in the opening can neatly and fixedly arrange the cables to avoid the clutter of stacking/interlacing of the cables, thereby preventing assembly defects such as assembly crimping, misaligning, upper housing bulging, and etc.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic device usable with a plurality of cables, the electronic device comprising:

a first component comprising a first housing and a second housing connected to each other, an accommodation space being formed between the first housing and the second housing, and an opening being formed at a junction of an edge of the first housing and the second housing; and a second component connected to the first component;

wherein the opening is configured for the cables to pass through so that the cables enter the accommodation space, and wherein two ends of the cables are respectively connected to electronic components inside the first component and to electronic components inside the second component for at least one of signal transmission or power transmission.

2. The electronic device of claim 1, further comprising a plurality of cable management structures, wherein the cable management structures are disposed in the opening and configured to be respectively connected to the cables.

3. The electronic device of claim 2, wherein the cable management structures are disposed on the edge of the first housing.

4. The electronic device of claim 3, wherein the cable management structures are sequentially arranged along the edge of the first housing.

5. The electronic device of claim 2, wherein the edge of the first housing has a recess, the recess defines a part of an outline of the opening, and the cable management structures are located in the recess.

6. The electronic device of claim 1, wherein the second housing comprises a sidewall, and the opening is formed at a junction of the edge of the first housing and the sidewall.

7. The electronic device of claim 6, wherein a top surface of the sidewall has a recess, and the recess defines a part of an outline of the opening.

8. The electronic device of claim 6, further comprising a cover, wherein the cover covers the opening, an outer wall surface of the sidewall has a recess, the cover has a fixing portion, and the fixing portion is fixed to the sidewall in the recess.

9. The electronic device of claim 8, wherein a surface of the fixing portion is substantially flush with the outer wall surface.

10. The electronic device of claim 1, further comprising:

a hinge device, wherein the first component and the second component are connected to each other through the hinge device; and a cover covering the hinge device and the opening.

11. An electronic device, comprising:

a host body comprising a first housing and a second housing connected to each other, an accommodation space being formed between the first housing and the second housing, an opening being formed at a junction of an edge of the first housing and the second housing;

a display connected to the host body; and a plurality of cables passing through the opening to enter the accommodation space, wherein two ends of the cables are respectively connected to electronic components inside the host body and to electronic components inside the display for at least one of signal transmission or power transmission.

12. The electronic device of claim 11, further comprising a plurality of cable management structures, wherein the cable management structures are disposed in the opening and configured to be respectively connected to the cables.

13. The electronic device of claim 12, wherein the cable management structures are disposed on the edge of the first housing.

14. The electronic device of claim 13, wherein the cable management structures are sequentially arranged along the edge of the first housing.

15. The electronic device of claim 12, wherein the edge of the first housing has a recess, the recess defines a part of an outline of the opening, and the cable management structures are located in the recess.

16. The electronic device of claim 11, wherein the second housing comprises a sidewall, and the opening is formed at a junction of the edge of the first housing and the sidewall.

17. The electronic device of claim 16, wherein a top surface of the sidewall has a recess, and the recess defines a part of an outline of the opening.

18. The electronic device of claim 16, further comprising a cover, wherein the cover covers the opening, an outer wall surface of the sidewall has a recess, the cover has a fixing portion, and the fixing portion is fixed to the sidewall in the recess.

19. The electronic device of claim 11, further comprising:

a hinge device, wherein the host body and the display are connected to each other through the hinge device; and a cover covering the hinge device and the opening.

20. An electronic device, comprising:

a host body comprising a first housing and a second housing connected to each other, an accommodation space being formed between the first housing and the second housing, an opening being formed at a junction of an edge of the first housing and the second housing;

a display connected to the host body; and a plurality of cables passing through the opening to enter the accommodation space, wherein the second housing comprises a sidewall, and the opening is formed at a junction of the edge of the first housing and the sidewall, and wherein a top surface of the sidewall has a recess, and the recess defines a part of an outline of the opening.

* * * * *